(12) United States Patent
Zelczer et al.

(10) Patent No.: US 7,178,545 B2
(45) Date of Patent: Feb. 20, 2007

(54) MODULATING BYPASS CONTROL SYSTEM AND METHOD

(75) Inventors: Alex Zelczer, Cleveland Hts., OH (US); Mark A. Votaw, North Canton, OH (US); Joe Ramunni, Wadsworth, OH (US)

(73) Assignee: ABCO Consulting, Inc., Cleveland Heights, OH (US)

( * ) Notice: Subject to any disclaimer, the term of this patent is extended or adjusted under 35 U.S.C. 154(b) by 186 days.

(21) Appl. No.: 11/041,859

(22) Filed: Jan. 24, 2005

(65) Prior Publication Data

US 2005/0178433 A1    Aug. 18, 2005

Related U.S. Application Data

(60) Provisional application No. 60/538,949, filed on Jan. 23, 2004.

(51) Int. Cl.
*G05D 16/16* (2006.01)
(52) U.S. Cl. .............. 137/14; 137/115.07; 137/115.23; 137/599.11; 137/12
(58) Field of Classification Search ........... 137/115.05, 137/115.07, 115.23, 599.11, 12, 14
See application file for complete search history.

(56) References Cited

U.S. PATENT DOCUMENTS

| | | | | |
|---|---|---|---|---|
| 4,487,363 A | * | 12/1984 | Parker et al. ............... | 236/49.3 |
| 4,732,318 A | * | 3/1988 | Osheroff .................... | 236/49.3 |
| 4,829,447 A | * | 5/1989 | Parker et al. ............... | 700/277 |
| 4,841,733 A | * | 6/1989 | Dussault et al. ............ | 62/93 |
| 5,249,596 A | * | 10/1993 | Hickenlooper et al. ..... | 137/334 |
| 5,535,768 A | * | 7/1996 | Snyder et al. ................ | 137/12 |
| 6,105,927 A | | 8/2000 | Zelczer et al. | |

\* cited by examiner

*Primary Examiner*—Ramesh Krishnamurthy
(74) *Attorney, Agent, or Firm*—Renner, Otto, Boisselle & Sklar, LLP

(57) ABSTRACT

A control system for a bypass duct includes a pneumatic damper control assembly, a sensor and a pneumatic switch. The damper control assembly includes a damper vane mountable in the bypass duct for movement between relative open and closed positions to regulate airflow through the bypass duct. The position of the damper vane is controllable via pressure applied through a damper control line. The sensor is mountable to the supply duct to transmit a pneumatic supply duct signal via a supply line based on at least one of air pressure or air velocity in the supply duct. Finally, the pneumatic switch opens or closes the connection between the damper control line and the supply line based on the difference between (1) the pneumatic supply duct signal via the supply line, and (2) the combination of the pneumatic pressure from the damper assembly and a switch biasing pressure.

19 Claims, 1 Drawing Sheet

MODULATING BYPASS CONTROL SYSTEM AND METHOD

This application claims the benefit of U.S. Provisional Patent Application No. 60/538,949, filed on Jan. 23, 2004, which is hereby incorporated herein in its entirety.

FIELD OF THE INVENTION

This invention relates generally to air handling system control, and more particularly, to a control system for a bypass duct in an air handling system.

BACKGROUND

An air handling system typically conditions a supply of air moving therethrough by heating, cooling or otherwise effecting the quality of the air moving through an air handling unit, such as an HVAC (heating, ventilation and/or air conditioning (cooling, humidifying, etc.)) unit. An air handling system typically includes a network of air ducts, and a supply duct and branches thereof generally deliver conditioned air from the air handling unit to a plurality of zones that make up the conditioned space. As the airflow to one or more zones changes, the airflow through the supply duct and its branches can become undesirably noisy, inefficient in mixing with the air in the conditioned space and/or have an objectionable feel to some occupants of the conditioned space in the path of the airflow.

One way to reduce or eliminate these problems is to divert some of the air from the supply duct through a bypass duct while maintaining a more consistent air pressure or air velocity in the supply duct. Many of the systems used to control the airflow through the bypass duct, however, are difficult to install and/or set properly, introduce other noises and/or are unstable.

SUMMARY

The present invention provides a pneumatic control system for a bypass duct in an air handling system that is easy to install and set up, is quiet, and is more stable than most nonpneumatic control systems and thus provides a more consistent air pressure in the supply duct even as the airflow to one or more zones is changed.

An exemplary pneumatic control system in accordance with the present invention includes a pneumatic damper control assembly, a sensor and a pneumatic switch. The pneumatic damper control assembly includes a damper vane mountable in the bypass duct that is movable between an open position which allows air to flow through the bypass duct, and a closed position which, relative to the open position, inhibits airflow through the bypass duct. A pneumatic circuit connecting the damper control assembly, the sensor and the switch can also connect to a master controller that can selectively provide a pneumatic control signal via signal line. The position of the damper vane is controllable via pneumatic pressure applied through a damper control line connected to the signal line. The sensor is mountable to the supply duct to transmit a pneumatic supply duct signal via a supply line based on at least one of air pressure or air velocity in the supply duct. Finally, the pneumatic switch is connected to the damper control line and thus also the signal line on one side and the supply line on the other side. The switch opens or closes the connection between the damper control line and the supply line based on the difference between (1) the pneumatic supply duct signal via the supply line on one side, and (2) the combination of the pneumatic control signal, the pneumatic pressure from the damper assembly and a switch biasing pressure on the other side.

An exemplary pneumatic switch includes a housing having two portions separated by a diaphragm. The first portion including a spring that provides a biasing force to the diaphragm, and the second portion lies on an opposite side of the diaphragm to which the supply line and the damper control line are connected. In a low supply duct pressure situation, the spring biases the diaphragm to close the damper control line, In a high supply duct pressure situation, the pressure of the supply duct can open the damper control line when it overcomes the spring bias.

An exemplary method of controlling the airflow through a bypass duct in an air handling system includes the following steps: moving a damper vane in the bypass duct between an open position which allows air to flow through the bypass duct and a closed position which, relative to the open position, inhibits airflow through the bypass duct; and opening and closing a connection between the damper control line and a supply line based on a difference between (1) a pneumatic supply duct signal via the supply line, and (2) the combination of the pneumatic pressure from the damper assembly via the damper control line and a biasing pressure.

Another exemplary system in accordance with the present invention includes a pneumatic damper control assembly, a sensor and a pneumatic switch. The pneumatic switch opens or closes the connection between a damper control line and a supply line based on the difference between (1) a pneumatic supply duct signal via the supply line, and (2) the combination of a pneumatic pressure from the damper control assembly and a switch biasing pressure.

The foregoing and other features of the invention are shown in the drawings and particularly pointed out in the claims. The following description and annexed drawings set forth in detail one or more illustrative embodiments of the invention; this being indicative, however, of but one or a few of the various ways in which the principles of the invention might be employed.

BRIEF DESCRIPTION OF THE DRAWINGS

The FIGURE discloses a schematic view of an exemplary air handling system in accordance with the present invention.

DETAILED DESCRIPTION

Figure 1:
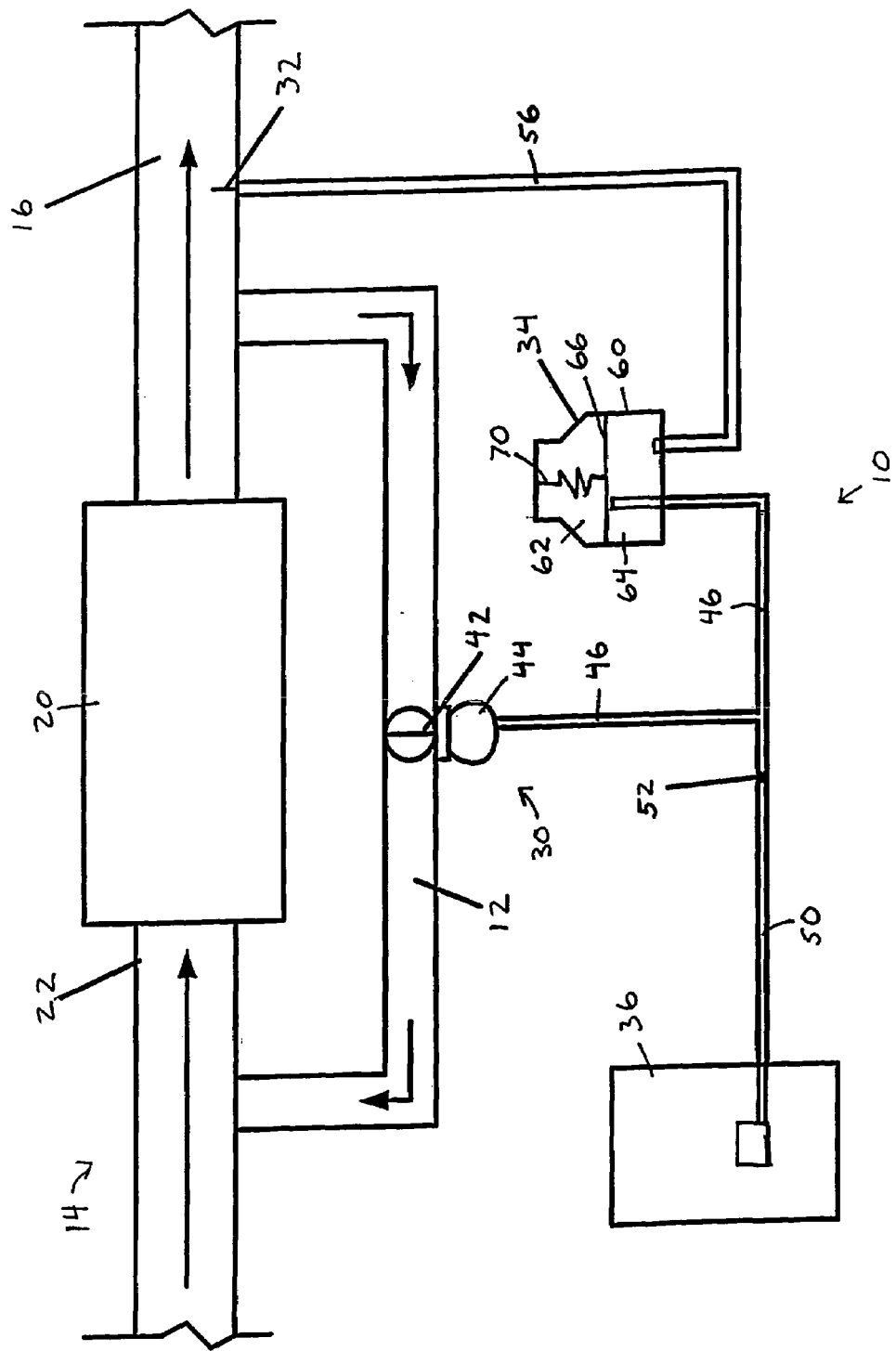

Referring now to the drawing in detail, specifically the FIGURE, the present invention provides a control system 10 for a bypass duct 12 in an air handling system 14. The bypass control system 10 is easy to install and set up, is quiet, and is more stable than some nonpneumatic control systems and thus provides a more consistent air pressure in a supply duct 16 even as the airflow to one or more zones is changed.

The illustrated air handling system 14 includes an air handling unit 20, such as a blower, a filter, a humidifier, a dehumidifier, and/or a heating, ventilation and air conditioning (HVAC) unit, etc. The air handling system 14 also includes an air duct network with the supply duct 16 and branches thereof for delivering air from the air handling unit 20 to a plurality of zones in the conditioned space. The bypass duct 12 can divert some air from the supply duct 16 to minimize noise and to maintain a more constant air pressure in the supply duct 16 as the amount of air delivered to each zone changes. The air handling system 14 also can include a return duct 22 and branches thereof for returning air to the air handling unit 20. The end of the bypass duct 12 is connected to the return duct 22 at a location spaced from the air handling unit 20 as far as possible, typically closer to a first branch in the return duct 22 than to the air handling unit 20, to minimize noise. A longer bypass duct 12 also provides more air space in which higher pressures can dissipate.

Another way to view the air handling system 14 is to use an analogy to an electrical circuit. The supply and return ducts 16 and 22 form a circuit that begins with the air handling unit 20. The air flows through the supply duct 16 and branching zone ducts out to zones of a building, and then the air returns to the air handling unit 20 through the return duct 22 and branches thereof. The bypass duct 12 provides a short-circuit between the supply duct 16 and the return duct 22.

The illustrated bypass control system 10 includes a pneumatic damper control assembly 30, a sensor 32 and a pneumatic switch 34. A pneumatic circuit connects each of these components via pneumatic lines (tubes for communicating pneumatic pressure) and connects the bypass control system 10 to a master controller 36. The pneumatic switch 34 opens and closes in response to pressure changes in the supply duct 16, which in turn can control the damper control assembly 30 to regulate the airflow through the bypass duct 12.

The pneumatic damper control assembly 30 includes a damper vane 42 mountable in the bypass duct 12 that is movable between an open position which allows air to flow through the bypass duct 12, and a closed position which, relative to the open position, inhibits airflow through the bypass duct 12. The damper control assembly 30 also includes a pneumatic damper motor 44 attached to the damper vane 42 to move the damper vane 42 between the relative open and closed positions. The bypass damper vane 42 is preferably mounted in the bypass duct 12 relatively close to the supply duct 16. The position of the damper vane 42 is controllable through control of the motor 44. No electrical connection is necessary since the damper motor 44 is powered by the pressure supplied via a damper control line 46, and/or a biasing element, such as a spring, in the damper motor 44. An exemplary pneumatic damper control assembly is disclosed in U.S. Pat. No. 6,105,927, which is hereby incorporated herein in its entirety. The damper control assembly 30 is connected to the switch 34 via the damper control line 46.

The master controller 36 can selectively provide a pneumatic control signal via a signal line 50 that is connected to the damper control line 46, which in turn is connected to the switch 34. A restriction 52 in the signal line 50 between the master controller 36 and the rest of the pneumatic circuit restricts the magnitude of the pressure transmitted through the signal line 50 to the switch 34 and the damper control assembly 30. The control signal typically is less than a biasing force applied in the damper control assembly 30 and thus generally is insufficient to cause the damper motor 44 to move the damper vane 42 without assistance from another source, namely the pneumatic switch 34 via the damper control line 46.

On the other side of the switch 34, the sensor 32 is mountable to the supply duct 16 to transmit a pneumatic supply duct signal via a supply line 56 to the switch 34. The sensor 32 typically is mounted to extend into the supply duct 16 downstream of the bypass duct 12, generally within several feet of the bypass duct 12. An exemplary sensor is a Pitot tube. The supply duct signal is based on at least one of air pressure or air velocity in the supply duct 16.

The pneumatic switch 34 is connected to the damper control line 46 and thus also the signal line 50 on one side and the supply line 56 on the other side. The switch 34 opens or closes the connection between the damper control line 46 and the supply line 56 based on the difference between (1) the pneumatic supply duct signal via the supply line 56 on one side, and (2) the combination of the pneumatic control signal, the pneumatic pressure from the damper assembly and a biasing force in the switch 34 on the other side. The resulting pressure signal in the damper control line 46 causes the damper motor 44 to move the damper vane 42 to the proper position to maintain a relatively constant pressure in the supply duct 16. This setup minimizes sudden changes in pressure at the damper control assembly 30, meaning that the damper control assembly 30 will react more slowly to pressure changes, and the hunting experienced by other systems does not occur in the bypass control system 10 provided by the present invention.

The pneumatic switch 34 in effect acts as a modulating controller. The switch 34 modulates the pressure sensed in the supply duct 16 and passes a small amount of air under pressure to the bypass damper control assembly 30 via the damper control line 46. This "leakage" through the switch 34 moves the bypass damper vane 42 only when necessary, in which case the bypass damper vane 42 will move to the proper position with minimal or no hunting. The pneumatic switch 34 changes the pressure supplied to the damper control line 46 slowly. Preferably, the bypass damper motor 44 only reacts to large changes in pressure.

An exemplary pneumatic switch 34 includes a housing 60 having two portions 62 and 64 separated by a diaphragm 66. The first portion 62 includes a spring 70 that provides a biasing force to the diaphragm 66, and the second portion 64 lies on an opposite side of the diaphragm 66. The supply line 56 and the damper control line 46 are connected to this second portion 64 of the switch housing 60. In a low supply duct pressure situation, the spring 70 biases the diaphragm 66 to close the damper control line 46. In a high supply duct pressure situation, the pressure of the supply duct 16 can open the diaphragm 66 to open the damper control line 46 when it overcomes the spring bias.

In one embodiment, the spring-biased pneumatic bypass damper motor 44 is biased to an open position and the diaphragm 66 in the pneumatic switch 34 also is biased to an open position. With the bypass damper vane 42 being spring-biased to the open position, pressure must be applied to the damper control assembly 30 to close it and to move the damper vane 42 to the closed position. Since the pneumatic switch 34 also is biased to an open condition, and the restriction 52 limits pressure through the control signal line 50 back to the master controller 36, pressure from an open pneumatic switch 34 leads to the application of a high pressure at the bypass damper motor 44 that tends to move the damper vane 42 to close the bypass duct 12.

When the pressure from the supply duct 16 rises, the pneumatic switch 34 moves to a closed position, closing an opening in the damper control line 46 to the control air signal and the bypass damper pressure. In this case, when the pneumatic switch 34 is closed, the control signal from the master controller 36 allows the bypass damper vane 42 to move to the open position because it cannot overcome the spring-bias force of the bypass damper motor 44. If the supply duct 16 has a low pressure signal from the sensor 32, the pressure cannot overcome the spring force in the switch 34, and the spring 70 will open the pneumatic switch 34. The control air from the master controller 32 will then be added to the air leaking from the pneumatic switch 34 and combined they will overcome the spring force in the bypass damper motor 44 and close the damper control assembly 30, which will move the damper vane 42 to the closed position. Thus, the bypass duct 12 opens when the pressure rises and closes when the pressure drops.

Consequently, when the pressure is high in the supply duct 16, more air is wasted by diverting it through the bypass duct 12. The damper control assembly 30 and the pneumatic switch 34 maintain the pressure in the damper control line 46 to balance the supply duct signal and the setting on the spring 70 in the pneumatic switch 34. The pneumatic switch 34 leaks pressure between the damper control line 46 and the sensor supply line 56.

In other words, a valve that is formed in part by the diaphragm 66 in the switch 34 opens or closes the damper control line 46 with the position of the diaphragm 66 to provide the proper pressure signal to operate the damper control assembly 30. The diaphragm 66 covers or uncovers an opening to regulate the air flow through the switch 34 from the respective lines.

In another embodiment (not shown), the damper vane is biased to an open position and the diaphragm in the pneumatic switch is biased to a closed condition. The diaphragm in the switch moves to an open position when the pressure from the supply duct rises. In this case, when the pneumatic switch is closed, the low pressure control signal from the control panel is sufficient on its own to close the bypass damper control assembly, which is spring-biased to an open condition. With the damper motor being spring-biased to an open condition, pressure must be applied to the damper motor to move the damper vane to the closed position. Since the pneumatic switch is biased to a closed condition, and the restriction limits pressure through the control signal line back to the master controller, a high pressure in the supply duct increases the pressure leaking through the pneumatic switch, and the low pressure control signal is countered by the leaked pressure. The resulting pressure is insufficient to overcome the spring force that biases the damper motor to the open condition. Thus, the bypass duct opens when the pressure rises and closes when the pressure drops.

The pneumatic switch 34 has an initial setting, based in part on the spring force of the particular spring 70 in the switch 34. The desired pressure in the supply duct 16 can be set by adjusting the pressure applied by the spring 70. This setting is adjustable, but generally is set once and can be forgotten. At whatever the set pressure is, the bypass damper vane 42 will remain in the proper position to divert the necessary amount of air through the bypass duct 12 to maintain a relatively constant pressure in the supply duct 16. The bypass control system 10 preferably maintains the pressure in the supply duct 16 at the desired setting, for example from 0.0 to 0.5 inches w.c.

In operation, a method of controlling the airflow through the bypass duct 12 in the air handling system 14 in accordance with the present invention includes the steps of moving a damper vane 42 in the bypass duct 12 between relative open and closed positions, and opening and closing a connection between a damper control line 46 and a supply line 56 based on a difference between (1) a pneumatic supply duct signal via the supply line 56, and (2) the combination of the pneumatic pressure from the damper assembly via the damper control line 46 and a biasing pressure from the spring 70.

Setting up the bypass control assembly 10 in accordance with the present invention is relatively simple. First, open only the smallest zone and adjust the biasing pressure in the switch 34 to close the damper vane 42. Listen for noise. If noisy, open the damper vane 42 by adjusting the biasing pressure in the switch 34 until the noise is no longer noticeable. The airflow through the smallest zone often can be up to 200% of the airflow in the supply duct 16 with all of the zones open without an objectionable increase in the noise level. In some instances, it might be desirable to have multiple bypass ducts having a relatively small cross-sectional area rather than a single bypass duct with a relatively large cross-sectional area.

Other types of pneumatic switches are contemplated by the present invention, which is in no way limited to the pneumatic switches described herein. Moreover, the pneumatic switch can be designed to be in either an open or a closed condition to effect a fully open bypass duct. Preferably, the pneumatic switch diverts more air through the bypass duct in response to a higher pressure in the supply duct, meaning that a higher sensed pressure leads to an open bypass damper.

The following discussion further highlights the concepts and advantages provided by bypass control systems in accordance with the present invention. Air handling units typically are designed for a particular air flow velocity (measured in cubic feet per minute (CFM)) in a main supply duct. From the supply duct, multiple branches provide the desired volume of conditioned air for each zone in the conditioned space. Each zone typically includes one or more rooms in a building.

The size of each branch duct is minimized so that the desired volume of air exits the duct outlet with sufficient velocity to mix with the air already in a room. Duct size typically is measured by cross-sectional area. The branch duct size generally is no larger than, and usually is smaller than, the size of the supply duct. If the air velocity in the duct is too low, the air only affects the area adjacent the duct outlet rather than mixing with the air to affect the air properties throughout the room.

Consequently, to provide effective conditioning of the air (heating, cooling, humidifying, dehumidifying, etc.), the airflow in a branch duct must have a certain velocity throw or push as it enters a zone from a duct. The main supply duct typically is designed to provide the necessary airflow when all of the branch ducts are open at the same time. When some branch ducts are closed, the supply duct is effectively oversized. Typically one or more of the branch ducts will be receiving little or no airflow at any given time. The air handling unit generally continues to push the same volume of air, however, so this effectively increases how much air passes through the branch ducts that remain open. This also effectively increases the pressure in the supply duct. Consequently, the air velocity can be too high rather than too low. Then, some people will object that the airflow is noisy or has an undesirable feel, like a wind coming from the duct. The desired amount of airflow and the temperature can be very subjective, and is subject to many different personal preferences.

Bypass ducts can resolve some objections to excess air flow and noise by diverting some air from the supply duct before the air can reach the space to be conditioned. This air then is recirculated through the air handling unit. Usually the bypass duct diverts air from the main supply duct, but the concept also can be applied to a branch supply duct.

Diverting air through the bypass duct can provide a more consistent pressure in the supply duct, which also reduces the amount of air moving through the branches into each zone. In other words, the bypass duct partially short-circuits the supply duct. The air velocity in each branch is maintained, while delivering a lower volume of air into each zone or room, thereby conditioning the air while minimizing or eliminating the noise and "feel" from excess airflow exiting the ducts.

Damper vanes typically are used to vary how much air moves through the bypass duct. In older buildings, air can be diverted from the supply duct and dumped into a large space, such as a room, a basement, or a crawl space that acts as a return duct even when no actual return duct network is present. With the increase in energy prices and increased concerns for energy efficiency, more recent practice has been to return the bypass air to a return side of the air handling unit rather than dumping it into an unconditioned space.

One mechanism used to control the amount of air moving through the bypass duct is a barometric-type damper with a weighted arm for dumping excess air from the supply duct to the return duct as the pressure in the supply duct increases. This type of damper is difficult to set at a precise point to provide the desired amount of diverted air. As a result, the installer must use a trial-and-error process to set it, fine tune it, and essentially play with it until the desired result is achieved. Although quite simple an operation, and in some cases it can do an adequate job, it can be tedious and time-consuming for the installer.

Another way to control how much air moves through the bypass duct is to measure the air velocity or pressure in the supply duct and then use an electric motor to move a damper vane into a position that lets the proper amount of air through the bypass duct. Electric motors can be noisy, however, thereby defeating one of the purposes of the bypass duct, which is to reduce the noise in the system. In addition, such systems typically require the installer to run electrical wires to power the motor and to power the motor controller, something that can be time-consuming and difficult to do, particularly in a retrofit application.

Some bypass control mechanisms are relatively unstable because they react to pressure changes in the supply duct too rapidly. When branch ducts open and close, the pressure in the supply duct can fluctuate for a period of time, particularly as some of the supply air is diverted into the bypass duct. This causes some control mechanisms to "hunt" for the proper position to achieve a desired pressure in the supply duct. This can lead to a yo-yo effect on the pressure in the supply duct as the amount of air diverted to the bypass duct changes over time. This oscillation in the supply of air can create additional air noise as the bypass diverts too much, too little, too much, too little, etc. until an equilibrium position is reached. As another zone opens or closes, however, the process begins again. All of this hunting, or as a result of this hunting, also wears the motor, which can create an additional source of noise.

Some air handling systems monitor the pressure in the supply duct and control the speed of the air in the supply duct based on the pressure in the supply duct. If the pressure rises, the fan speed in the air handling unit typically would rise as well. Unfortunately, operating against higher pressure in the supply duct is harder on fan motors. In addition, if a motorized damper is used by the bypass duct, hunting by the bypass motor also causes the fan controller to hunt for the proper fan speed and the combination can make the system even more unstable before it reaches an equilibrium point.

In contrast, a bypass control system 10 in accordance with the present invention is entirely pneumatic, which makes the system quieter and easier to install. Moreover, because the system reacts to pressure changes more slowly, the control system is more stable and reaches an equilibrium point more quickly.

A bypass control system 10 provided in accordance with the present invention thus provides an adjustable, pneumatic modulating bypass controller or switch 34 that cooperates with a pneumatic spring-biased bypass damper assembly 30 and a restricted pneumatic control signal to provide a system that goes to an equilibrium point without minimal or no hunting and without any electric motors. In fact, the bypass control system 10 provided by the present invention does not include any electrical equipment. The damper control assembly 30, the sensor 32 and the switch 34 operate entirely with pneumatic inputs.

Any electrical power is limited to power supplied at the master controller 36, which typically is located near an electrical panel and is easily installed, maintained and serviced. Without electrical wiring, the system 10 is less expensive and more reliable. No electrical power is needed for either the damper control assembly 30 or the switch 34 or the sensor 32. This means that the electrical devices required for some systems, such as a transformer, electrical motors, electrical switches, electrical sensors, etc., are not needed in this system, making this system less expensive and more reliable.

Although the invention has been shown and described with respect to a certain preferred embodiment, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A control system for a bypass duct in an air handling system, comprising:
   a control signal line for receiving a pneumatic control signal selectively provided by a master controller;
   a pneumatic damper control assembly including a damper vane mountable in the bypass duct that is movable between an open position which allows air to flow through the bypass duct and a closed position which, relative to the open position, inhibits airflow through the control bypass duct, the control position of the control damper vane being controllable via pneumatic pressure applied through a damper control line connected to the signal line;
   a sensor mountable to the supply duct to transmit a pneumatic supply duct control signal via a supply line based on at least one of air pressure or air velocity in the supply duct; and
   a pneumatic switch connected to the damper control line and thus also the signal line on one side and the supply line on the other side, that opens or closes the connection between the damper control line and the supply line based on the difference between (1) the pneumatic supply duct signal via the supply line on one side, and (2) the combination of the pneumatic control signal, the pneumatic pressure from the damper assembly and a switch biasing pressure on the other side.

2. A system as set forth in claim 1, wherein the switch is biased open.

3. A system as set forth in claim 2, wherein the switch includes a housing having two portions separated by a diaphragm, a first portion including a spring that applies a biasing force to the diaphragm, and a second position to which the supply line and the damper control line are connected.

4. A system as set forth in claim 3, wherein the diaphragm closes the damper control line.

5. A system as set forth in claim 1, wherein the pneumatic damper control assembly includes a pneumatic motor that biases the damper vane to an open position.

6. A system as set forth in claim 5, wherein the control signal is less than a biasing force applied to the pneumatic damper vane in the damper control assembly.

7. A system as set forth in claim 1, wherein the signal line is connected to the pneumatic damper control line between the pneumatic damper control assembly and the pneumatic switch.

8. A system as set forth in claim 1, wherein the signal line includes a restriction that restricts the magnitude of the pressure transmitted therethrough.

9. A system as set forth in claim 1, incorporated in the air handling system having the bypass duct for diverting airflow from the supply duct, the damper vane being mounted in the bypass duct and the sensor being a Pitot tube mounted to extend into the supply duct.

10. A system as set forth in claim 9, wherein the damper vane is mounted closer to a supply duct end of the bypass duct than to an opposite end of the bypass duct.

11. A system as set forth in claim 9, wherein the Pitot tube is mounted to the supply duct downstream of the bypass duct.

12. A system as set forth in claim 11, wherein the Pitot tube is mounted within several feet of the supply duct.

13. A system as set forth in claim 9, wherein the bypass duct is connected to a return duct at a location spaced from an air handling unit.

14. A system as set forth in claim 13, wherein the bypass duct is connected to the return duct at a location that is closer to a first branch in the return duct than to the air handling unit.

15. A method of controlling the airflow through a bypass duct in an air handling system, comprising the steps of moving a damper vane in the bypass duct between an open position which allows air to flow through the bypass duct and a closed position which, relative to the open position, inhibits airflow through the bypass duct, the position of a damper vane being controllable via pneumatic pressure on a pneumatic switch connected to the damper control line and the supply line applied through a damper control line; and opening and closing a connection between the damper control line and a supply line based on a difference between (1) a pneumatic supply duct signal via the supply line, and (2) the combination of the pneumatic pressure from the damper assembly via the damper control line and a biasing pressure.

16. A method as set forth in claim 15, further comprising the step of biasing the damper vane to the open position.

17. A method as set forth in claim 15, further comprising the step of biasing the pneumatic switch to the open position.

18. A method as set forth in claim 15, further comprising the step of selectively providing a pneumatic control signal via a signal line to the damper control line, whereby the opening and closing step includes opening and closing the connection between the damper control line and the supply line based on the difference between (1) the pneumatic supply duct signal via the supply line, and (2) the combination of the pneumatic control signal, the pneumatic pressure from the damper assembly and the biasing pressure on the other side.

19. A control system for a bypass duct in an air handling system, comprising:

a pneumatic damper control assembly including a damper vane mountable in the bypass duct that is movable between an open position which allows air to flow through the bypass duct and a closed position which, relative to the open position, inhibits airflow through the bypass duct, the position of the damper vane being controllable via pneumatic pressure applied through a damper control line;

a sensor mountable to a supply duct to transmit a pneumatic supply duct signal via a supply line based on at least one of air pressure or air velocity in the supply duct; and a pneumatic switch connected to the damper control line on one side and the supply line on the other side, that opens or closes the connection between the damper control line and the supply line based on the difference between (1) the pneumatic supply duct signal via the supply line on one side, and (2) the combination of the pneumatic pressure from the damper assembly and a switch biasing pressure on the other side.

* * * * *